(No Model.) 2 Sheets—Sheet 1.

E. R. THOMASON.
APPARATUS FOR REDUCING BITUMINOUS ROCK.

No. 502,211. Patented July 25, 1893.

Witnesses,
Inventor,
Edwin R. Thomason
By Dewey & Co.
Atty.

(No Model.) 2 Sheets—Sheet 2.

E. R. THOMASON.
APPARATUS FOR REDUCING BITUMINOUS ROCK.

No. 502,211. Patented July 25, 1893.

Witnesses,

Inventor,
Edwin R Thomason
By Dewey & Co.
Attys

United States Patent Office.

EDWIN R. THOMASON, OF SAN FRANCISCO, CALIFORNIA.

APPARATUS FOR REDUCING BITUMINOUS ROCK.

SPECIFICATION forming part of Letters Patent No. 502,211, dated July 25, 1893.

Application filed February 15, 1893. Serial No. 462,494. (No model.)

*To all whom it may concern:*

Be it known that I, EDWIN R. THOMASON, a citizen of the United States, residing in the city and county of San Francisco, State of California, have invented an Improvement in Apparatus for Reducing Bituminous Rock and other Asphaltum Compounds; and I hereby declare the following to be a full, clear, and exact description of the same.

My invention relates to that class of apparatus for reducing to a plastic or softened condition, bituminous rock and other asphaltum compounds, in which a rotating vessel is employed, which receives and discharges the material, and in which it is subjected to the necessary heat, to reduce it.

My invention consists in certain improvements especially applicable to that apparatus for which Patent No. 492,639, was granted to me February 28, 1893.

Briefly stated these improvements include a novel, automatically and periodically operating feed hopper, a novel automatically operating receiving door for the reducing vessel and a novel gate or shutter for cutting off communication between the reducing vessel and the underlying discharge chamber, thereby preventing the entrance of cold air to the vessel when the discharge chamber is temporarily opened to withdraw the reduced material.

The object of these improvements is to increase the general efficiency of the apparatus, by the saving of time and labor, and the avoidance of any cooling of the material during discharge.

Figure 1:
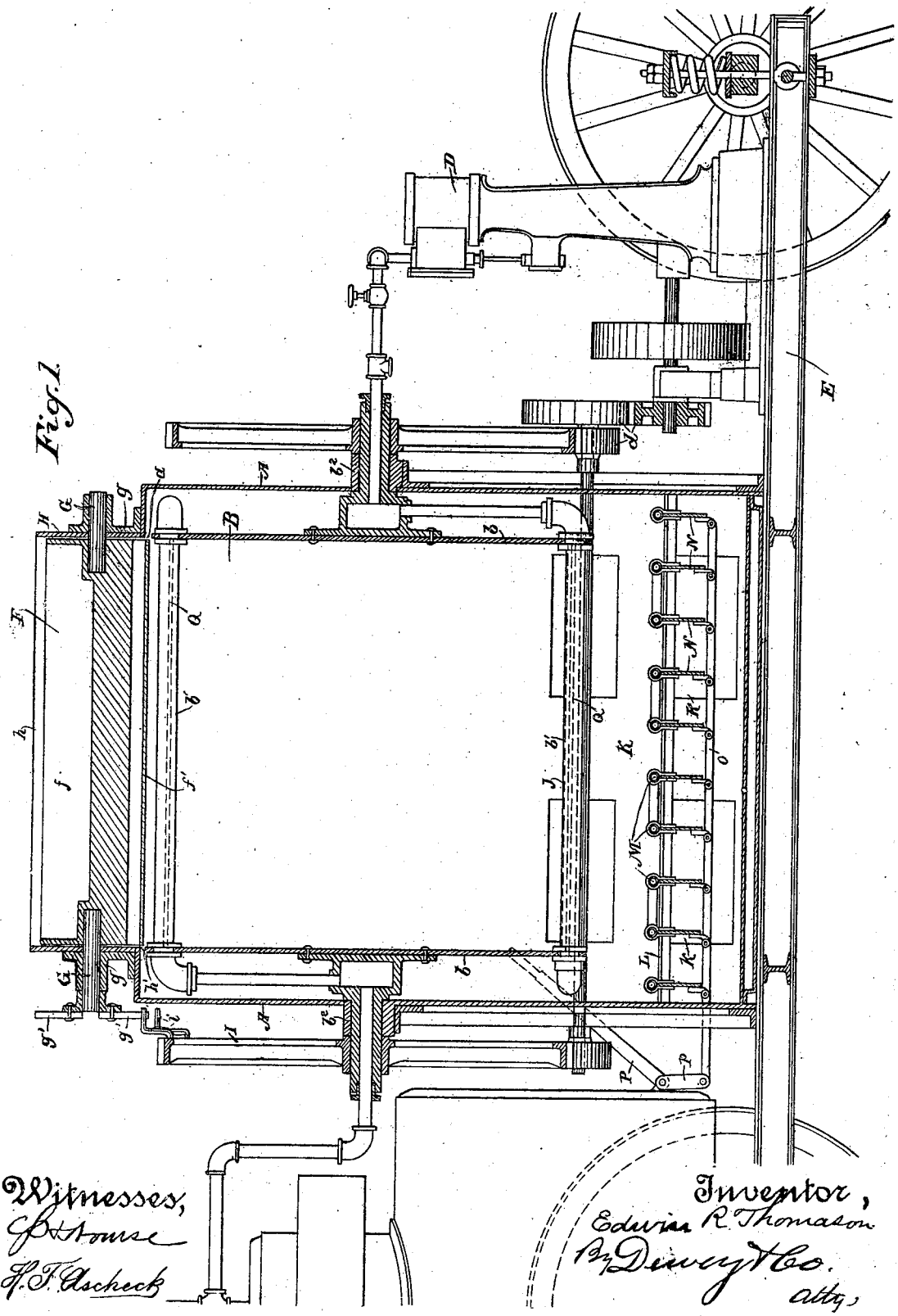
Figure 2:
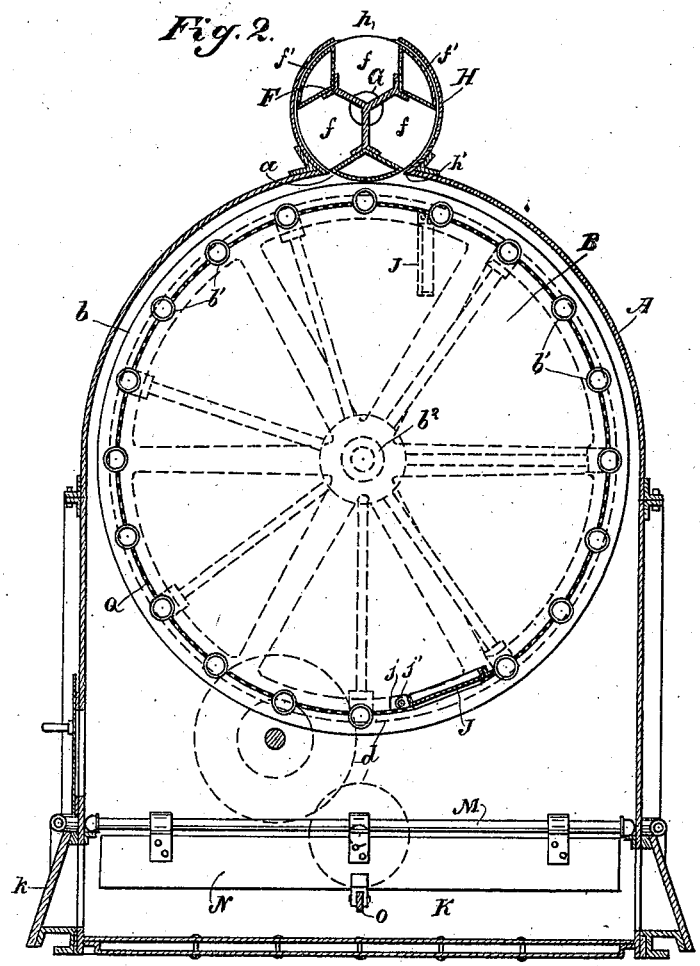
Figure 3:
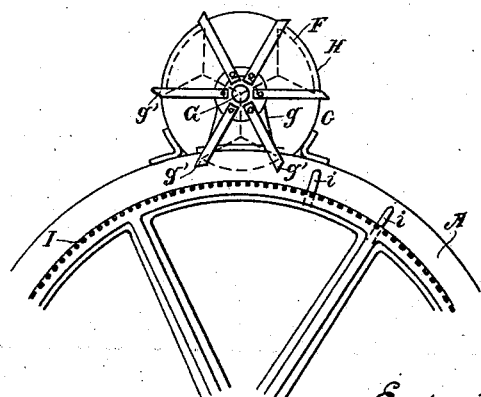

Referring to the accompanying drawings for a more complete explanation of my invention,—Figure 1 is a vertical, longitudinal section of my apparatus. Fig. 2 is a vertical cross section. Fig. 3 is an end view showing the hopper operating contacts.

The details of construction of any suitable reducing vessel, such as the reel here shown, its manner of mounting, and the means for heating it, need not herein be specifically described as they are unnecessary to a full understanding of my improvements, and are moreover substantially similar to those described in my former application above referred to. It will suffice, therefore, to state that the reducing vessel here represented by the reel B, is of an open character, its periphery being formed of parallel separated rods or bars $b'$, which may be solid, but are preferably tubular to provide for the circulation of steam for heating the contents of the reel. These rods or bars are joined to end heads $b$, which are mounted on bearings $b^2$ in the ends of the shell or casing A, in which the reel rotates. The reel is rotated by power from an engine D, transmitted through suitable devices, as, for example, the gears at $d$. The whole apparatus may be mounted on a wheeled truck E.

The top of the casing A has an opening $a$. Above this is the invertible or rotating feed hopper F. This is mounted upon a shaft G, supported in brackets $g$ from the casing top. The hopper is confined within a guard shell H which is open above at $h$, to expose the hopper, and is open below at $h'$, to expose the opening $a$ in the top of main casing A. The material is supplied to the hopper, when the latter is in a vertical position, and then the hopper, being turned or inverted, will carry it around and deliver it through the opening $a$ in casing A, to the interior of reel B, through a door in the reel which I shall hereinafter describe.

A periodical movement, timely with the movement of the reel, and the coming of its door under opening $a$, is automatically imparted by means, as follows: Upon the end of the hopper shaft G is a spider or skeleton disk having arms $g'$. Upon the end gudgeon of the reel is a wheel I provided with pins $i$ which are adapted to come in contact with the spider arms. The location and arrangement of these arms and contact pins are such that as the door of the reel arrives under opening $a$, the first contact will take place and the hopper will be rotated sufficiently to discharge its supply into the reel. Then as the reel moves on, a second contact will occur which will carry the hopper to position to receive a fresh supply and to await the first contact again when the reel is once more ready to receive a charge. Now, to increase the capacity of the hopper by increasing the times of its charge delivery, and to avoid unnecessary delay between charges, the hopper is divided into compartments of any suitable number. I have here shown three, designated by $f$ and formed by suitable partitions, said compartments being equidistant and separated at their openings by closed portions $f'$ of equal length of arc, this length of both the compartment openings and the closed portions being great enough to alternately open and close the opening $a$ in the top of casing A.

In operation, as soon as the reel arrives in position to receive a charge, the hopper will be turned so that one of its compartments will be brought to position to discharge into the reel, and as the reel door moves away, the hopper will be turned so that its succeeding closed portion will cover opening $a$, thus confining the heat, and the compartment preceding the first mentioned compartment will be turned to a vertical position. Into this the material will be fed, the hopper remaining at rest, while the reel performs a complete rotation. Then once more the hopper will be turned to deliver the charge of its next compartment, and immediately turned farther to close the opening $a$: and so on.

The door J of the reel is a gravity one. It is mounted in a suitable bearing frame $j$, to one side of which it is freely hinged at $j'$ in such a manner that it may swing inwardly. Now it will be seen that on the final uprising side of the reel, when the door is clear of the material, said door will, by gravity, swing open and will, when it arrives at the top be fully open, and will hang perpendicularly. As it passes the top and approaches the down moving side, it will swing, by gravity, to a closed position. Thus the opening and closing of the door are wholly automatic.

In the bottom of casing A below the reel is a discharge chamber K having a door $k$ in one end. When this door is opened, in order to withdraw the reduced material which has fallen into the chamber from the reel, the cold air will pass in through the chamber into the reel. To avoid this, I have a shutter or gate operated from without and adapted to cut off communication with the outer air. This device is located in the upper portion of the discharge chamber and the best form of it is as follows: Supported upon suitable end bearings L, is a series or coil of pipes M, on which are pivoted flaps or plates N by sleeves, $n$. To the lower ends of these flaps or plates is secured a connecting link O, which is operated from without by the lever P and connections $p$. Now, when the door of the discharge chamber is closed, the flaps or plates all hang downwardly and the material can drop from the reel, freely, into the discharge chamber. But when the door $k$ is about to be opened, the flaps or plates are all turned upwardly to a horizontal position and the communication with the reel above will thus be cut off, temporarily, and cold air will not enter. The pipes M have steam passed through them to assist in maintaining the heat within the casing.

Around the reel B is secured an encircling screen Q to insure the reduction of the material to the proper size before being discharged.

Having thus described my invention, what I claim as new, and desire to secure by Letters Patent, is—

1. In an apparatus for reducing bituminous rock and other asphaltum compounds, the combination of a continuously rotating vessel in which the material is reduced, and an intermittently rotatable hopper above adapted to discharge its supply into the vessel at intervals, substantially as herein described.

2. In an apparatus for reducing bituminous rock and other asphaltum compounds, the combination of a rotating vessel in which the material is reduced, and a periodically rotating hopper above divided into compartments adapted to receive and to deliver their charges successively into the reducing vessel, substantially as herein described.

3. In an apparatus for reducing bituminous rock and other asphaltum compounds, the combination of a rotating reducing vessel, a feed hopper above divided into compartments adapted to receive and to deliver their charges successively into the reducing vessel, and connections between said vessel and hopper whereby the feed hopper is periodically operated at timely intervals, substantially as herein described.

4. In an apparatus for reducing bituminous rock and other asphaltum compounds, the combination of a rotating reducing vessel, a feed hopper above divided into compartments adapted to receive and to deliver their charges successively into the reducing vessel, and connections between said vessel and hopper whereby the feed hopper is periodically operated at timely intervals, consisting of the wheel on the reducing vessel having the contact pins and the arms on the hopper shaft with which said pins come in contact, substantially as herein described.

5. In an apparatus for reducing bituminous rock and other asphaltum compounds, the combination of a continuously rotating reducing vessel, an outer casing having a top opening, and an invertible feed hopper intermittently actuated and adapted by its movement to alternately expose said opening to deliver its charge into the reducing vessel and to close it, while receiving a fresh supply, substantially as herein described.

6. In an apparatus for reducing bituminous rock and other asphaltum compounds, the combination of a rotating reducing vessel, an outer casing having a top opening, and a periodically rotating feed hopper divided into compartments with intervening closed portions, whereby the opening in the casing is successively opened and closed, and successive charges are delivered to the reducing vessel, substantially as herein described.

7. In an apparatus for reducing bituminous rock and other asphaltum compounds, the combination of a rotating reducing vessel, an outer casing having a top opening, a feed hopper divided into compartments with intervening closed portions and adapted to successively open and close the opening of the casing, and to successively deliver charges to the reducing vessel, a casing exterior to said hopper for guarding its compartments on the sides, and connections for periodically rotating said hopper, substantially as herein described.

8. In an apparatus for reducing bituminous rock and other asphaltum compounds, a rotating reducing vessel and a feed device adapted to deliver material into the top of the vessel, in combination with an inwardly opening freely swinging gravity door carried by the reducing vessel, substantially as herein described.

9. In an apparatus for reducing bituminous rock and other asphaltum compounds, the combination of a reducing vessel, an outer casing having a discharge chamber in its lower portion with a door and an adjustable gate or shutter in the upper portion of said discharge chamber, whereby communication with the reducing vessel above may be cut off when the door is opened, substantially as herein described.

10. In an apparatus for reducing bituminous rock and other asphaltum compounds, the combination of a reducing vessel, an outer casing having a discharge chamber in its lower portion with a door and an adjustable gate or shutter in the upper portion of said discharge chamber, whereby communication with the reducing vessel above may be cut off when the door is opened, said gate or shutter consisting of the rock screens and the connected flaps or plates, substantially as herein described.

11. In an apparatus for reducing bituminous rock and other asphaltum compounds, the combination of a reducing vessel, an outer casing having a discharge chamber in its lower portion with a door and an adjustable gate or shutter in the upper portion of said discharge chamber, whereby communication with the reducing vessel above may be cut off when the door is opened, said gate or shutter consisting of the rock screens and the connected flaps or plates, and the means for operating it from without, consisting of the connecting link and the lever and connections, substantially as herein described.

12. In an apparatus for reducing bituminous rock and other asphaltum compounds, the combination of an outer casing having a discharge chamber in its base, a reducing vessel within the casing, a series or coil of steam pipes M below the reducing vessel and above the discharge chamber, a series of connected shutter flaps or plates pivoted on said pipe and connections for operating said flaps or plates from without, substantially as herein described.

In witness whereof I have hereunto set my hand.

EDWIN R. THOMASON.

Witnesses:
C. F. CORMACK,
P. A. PIODA.